Patented Oct. 10, 1944

2,360,280

UNITED STATES PATENT OFFICE 2,360,280

HEAT-TRANSMITTING, LIGHT-ABSORBING GLASS AND ARTICLES MADE THEREFROM

Thomas W. Rolph and Samuel J. Harris, Newark, Ohio, assignors to Holophane Company, Inc., New York, N. Y., a corporation of Delaware No Drawing. Application July 17, 1941, Serial No. 402,876

8 Claims. (Cl. 106—52)

The present invention relates to heat-transmitting, light-absorbing glass and articles made therefrom.

In heating devices employing infra-red radiators, such as hot filaments, it is sometimes desirable to use a cover glass or glass enclosure which transmits the maximum amount of heat rays and yet absorbs a substantial amount of visible rays. The reason for this is that such heat producing devices of large capacities are often used in batteries and would give off so much visible light as to be glaring whenever exposed to view. To reduce the glare this visible light must be absorbed, yet the absorption of visible light must not interfere seriously with the transmission of heat rays, else the efficiency of the heating device is impaired. With incandescent radiating heat lamps the lamp itself converts about 90% of the energy input into infra-red rays and the amount of heat produced in the radiation in the visible spectrum is 4% to 5% of the total radiant energy.

This invention concerns glasses which absorb a large amount of radiation in the visible portion of the spectrum but transmit a large amount of light in the infra-red portion of the spectrum.

Owing to the closeness of these cover glasses to the sources and the absorption of radiant energy by them the cover glasses are subject to wide variations in temperatures and to guard against damage it is preferable to heat-treat the closures to make them resistant to thermal shock. The more usual glasses used where resistance to heat strain is necessary have employed boric oxide, but these glasses have been found unsuitable for the present purposes because the presence of boric oxide in glass seriously interferes with infra-red transmission.

In carrying out the present invention the glass batch is essentially one having normally high transmission of both visible and infra-red rays. Such a glass ordinarily contains a high percentage of an acid oxide—silica ($SiO_2$) and lesser but substantial amounts of alkaline or basic oxides, such as soda ($Na_2O$), potash ($K_2O$), lime ($CaO$), magnesia ($MgO$), and lead oxide ($PbO$). Suitable absorbents are added to the glass to reduce the transmission of visible rays without greatly affecting the infra-red rays. These absorbents are color selective and the visible light transmitted is accordingly colored.

A typical good glass in which the purposes of this invention are accomplished employs .5% to 1.0% of green chrome oxide. A typical formula using this oxide is as follows:

| | Per cent |
|---|---|
| $SiO_2$ | 73 |
| $Na_2O$ | 17 |
| $CaO$ | 8 |
| $Cr_2O_3$ | 0.5 |
| Minor ingredients | 1.5 |
| Total | 100.0 |

A comparison of the light and heat transmitting qualities of glass of this general character with and without chromium is given below:

| | Heat transmission | Light transmission |
|---|---|---|
| | Per cent | Per cent |
| Without chromium | 81 | 90 |
| With chromium | 77 | 29 |

Another ingredient suitable for producing the kind of glass herein described is from 1% to 1.5% of manganese dioxide. A typical formula using manganese dioxide is the following:

| | Per cent |
|---|---|
| $SiO_2$ | 73 |
| $Na_2O$ | 17 |
| $CaO$ | 8 |
| $MnO_2$ | 1 |
| Minor ingredients | 1 |
| Total | 100 |

A comparison of the light and heat transmitting qualities of glass of this general character with and without manganese is given below:

| | Heat transmission | Light transmission |
|---|---|---|
| | Per cent | Per cent |
| Without manganese | 81 | 90 |
| With manganese | 76 | 35 |

Sometimes it is desirable to use combinations of these oxides in order to obtain the maximum light absorption for a given degree of heat transmission. There is a distinct advantage in this although in practice the advantage is not large and the single ingredient may be preferred from the standpoint of simplicity or color of glass. The advantage obtained due to the combination of two ingredients is in absorbing different portions of the visible spectrum, while transmitting approximately equally well the radiation in the infra-red region. For example, green chromium oxide absorbs a large amount of radiation in the red and blue portions of the visible spectrum, transmitting radiation in the green portion freely; manganese dioxide absorbs strongly in the yellow and green portion of the spectrum while transmitting much more radiation in the blue and red portions. Consequently a combination of these two will blanket the visible spectrum more thoroughly than either one alone yet the transmission in the infra-red region is not greatly different for the two ingredients.

A typical glass providing these advantages of this combination is given by the following formula:

|  | Per cent |
|---|---|
| $SiO_2$ | 73 |
| $Na_2O$ | 17 |
| CaO | 8 |
| $MnO_2$ | .4 |
| $Cr_2O_3$ | .3 |
| Minor ingredients | 1.3 |
| Total | 100.0 |

A comparison of the approximate light and heat transmitting qualities of glass of this general character with and without the chromium-manganese combination is given below.

|  | Heat transmission | Light transmission |
|---|---|---|
|  | Per cent | Per cent |
| Without chromium and manganese | 81 | 90 |
| With chromium and manganese | 76 | 25 |

Another ingredient suitable for the purpose of transmitting heat and absorbing light is a mixture of .3% to 1.0% selenium and .3% to 1.0% cadmium. When selenium and cadmium are used, it is desirable to include zinc oxide in the batch in order to bring out the color and so produce the light absorbing qualities. It is generally best to introduce the selenium in the form of selenium dioxide and to introduce the cadmium in the form of cadmium sulphide. In any analysis of the glass, the selenium then appears in the original form of selenium dioxide and the cadmium appears as cadmium oxide. A typical analysis of glass for accomplishing this result is as follows:

|  | Per cent |
|---|---|
| $SiO_2$ | 67 |
| $Na_2O$ | 12 |
| $K_2O$ | 7 |
| ZnO | 12 |
| $SeO_2$ | 0.6 |
| CdO | 0.6 |
| Minor ingredients | 0.8 |
| Total | 100.0 |

A comparison of the light and heat transmitting qualities of glass of this general character with and without selenium and cadmium is given below:

|  | Heat transmission | Light transmission |
|---|---|---|
|  | Per cent | Per cent |
| Without selenium and cadmium | 81 | 90 |
| With selenium and cadmium | 79 | 17 |

The selenium-cadmium glass absorbs large amounts of radiation in the blue, green and yellow portions of the visible spectrum transmitting radiation in the red portion freely. If a further color control is desired one can add to the selenium-cadmium glass small amounts of chromic oxide, or manganese dioxide, or both within the proportions above given so as to absorb further visible rays.

The metal produced by employing the above formulas is fabricated into glass articles, usually by pressing in suitable molds. The glass articles are clear and may be given the desired configuration and provided with prismatic or diffusing surfaces analogous to those used in devices designed for controlling visible light rays. The prismatic action on the infra-red radiation is similar to that in the visible range.

As the source employed has a ratio of heat rays to visible rays of the order of 20 to 1 and the glass filters give transmission of substantially three-quarters of the infra-red and only from about one-sixth to one-third of the visible it follows that about 70% of the energy of the source is emitted as heat rays and only about 1% or 2% is emitted as visible light, so that the ratio of infra-red to visible output is substantially increased to the order of about 50 to 1.

The pressed articles are tempered by heating them to the annealing range temperature and then subjecting them to a quick cooling process, for example, by air jets, thereby producing an article of heat-transmitting, light-absorbing glass which is highly resistant to thermal shock and well adapted for use with infra-red drying lamps.

What is claimed is:

1. A clear glass filter for use with a radiant energy source wherein the ratio of infra-red radiation to visible radiation is in the order of 20 to 1 and to selectively transmit substantially three-quarters of the infra-red and from about one-sixth to about one-third of the visible radiation and comprising a silicate glass free of boron and containing a visible light absorbent selected from the group consisting of (a) $Cr_2O_3$ .5% to 1.0%; (b) $MnO_2$ 1% to 1.5%; (c) $Cr_2O_3$ up to 1.0% and $MnO_2$ up to 1.5%; (d) $SeO_2$ .3% to 1.0%, an CdO .3% to 1.0%; (e) $SeO_2$ up to 1.0%, CdO up to 1.0% and $Cr_2O_3$ up to 1.0%; (f) $SeO_2$ up to 1.0%, CdO up to 1.0% and $MnO_2$ up to 1.5%; (g) $SeO_2$ up to 1.0%, CdO up to 1.0%, $Cr_2O_3$ up to 1.0% and $MnO_2$ up to 1.5%, whereby the ratio of infra-red radiation transmitted to the visible radiation transmitted is substantially increased.

2. A clear glass filter for use with a radiant energy source wherein the ratio of infra-red radiation to visible radiation is in the order of 20 to 1 and to selectively transmit substantially three-quarters of the infra-red and substantially 29% of the visible radiation and comprising a silicate glass free of boron and containing as a visible light absorbent $Cr_2O_3$, from .5% to 1.0% whereby the ratio of infra-red radiation transmitted to the visible radiation transmitted is substantially increased.

3. A clear glass filter for use with a radiant energy source wherein the ratio of infra-red radiation to visible radiation is in the order of 20 to 1 and to selectively transmit substantially three-quarters of the infra-red and substantially 35% of the visible radiation and comprising a silicate glass free of boron and containing as a visible light absorbent $MnO_2$ from 1% to 1.5%, whereby the ratio of infra-red radiation transmitted to the visible radiation transmitted is substantially increased.

4. A clear glass filter for use with a radiant energy source wherein the ratio of infra-red radiation to visible radiation is in the order of 20 to 1 and to selectively transmit substantially three-quarters of the infra-red and substantially 25% of the visible radiation and comprising a silicate glass free of boron and containing as a visible light absorbent $Cr_2O_3$ up to 1.0% and $MnO_2$ up to 1.5%, whereby the ratio of infra-red radiation transmitted to the visible radiation transmitted is substantially increased.

5. A filter such as claimed in claim 1 rendered resistant to heat shock by heating the fabricated article to the annealing range of temperature and then cooling it rapidly whereby the internal structure of the filter is maintained under stress.

6. A filter such as claimed in claim 2 rendered resistant to heat shock by heating the fabricated article to the annealing range of temperature and then cooling it rapidly whereby the internal structure of the filter is maintained under stress.

7. A filter such as claimed in claim 3 rendered resistant to heat shock by heating the fabricated article to the annealing range of temperature and then cooling it rapidly whereby the internal structure of the filter is maintained under stress.

8. A filter such as claimed in claim 4 rendered resistant to heat shock by heating the fabricated article to the annealing range of temperature and then cooling it rapidly whereby the internal structure of the filter is maintained under stress.

THOMAS W. ROLPH.
SAMUEL J. HARRIS.